US012041150B2

United States Patent
Johnson et al.

(10) Patent No.: US 12,041,150 B2
(45) Date of Patent: Jul. 16, 2024

(54) ENHANCED APPLICATION PROGRAMMING INTERFACE GATEWAY ORCHESTRATOR

(71) Applicant: Level 3 Communications, LLC, Broomfield, CO (US)

(72) Inventors: Matthew Johnson, Littleton, CO (US); Thomas Durdin, Longmont, CO (US); Jeff Scheufele, Lafayette, CO (US); John T. Pugaczewski, Hugo, MN (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 18/509,226

(22) Filed: Nov. 14, 2023

(65) Prior Publication Data

US 2024/0163351 A1    May 16, 2024

Related U.S. Application Data

(60) Provisional application No. 63/383,896, filed on Nov. 15, 2022.

(51) Int. Cl.
*H04L 67/63* (2022.01)
*H04L 9/40* (2022.01)
*H04L 43/062* (2022.01)

(52) U.S. Cl.
CPC ............ *H04L 67/63* (2022.05); *H04L 43/062* (2013.01); *H04L 63/102* (2013.01)

(58) Field of Classification Search
CPC ...... H04L 67/63; H04L 43/062; H04L 63/102
See application file for complete search history.

(56) References Cited

U.S. PATENT DOCUMENTS

| 7,056,893 | B2 * | 6/2006 | Roy | A61K 31/02 |
| | | | | 424/433 |
| 9,936,005 | B1 * | 4/2018 | Palladino | H04L 67/56 |
| 11,388,164 | B2 * | 7/2022 | Joyce | H04L 63/0209 |
| 11,838,355 | B2 * | 12/2023 | Palladino | H04L 67/10 |
| 2012/0117577 | A1 * | 5/2012 | Swinfen | G07F 19/211 |
| | | | | 709/224 |
| 2018/0159730 | A1 * | 6/2018 | Kumar | H04L 67/10 |
| 2021/0036925 | A1 * | 2/2021 | Boddam | H04L 41/5054 |
| 2021/0208961 | A1 * | 7/2021 | Dutta | G06F 11/0772 |
| 2022/0174485 | A1 * | 6/2022 | Abhigyan | H04W 12/06 |
| 2023/0015697 | A1 * | 1/2023 | Krishnan | H04L 67/563 |
| 2023/0018000 | A1 * | 1/2023 | Abhigyan | H04L 67/34 |

(Continued)

*Primary Examiner* — Oanh Duong (57) ABSTRACT

This disclosure describes systems, methods, and devices related to using an application programming interface (API) gateway orchestration layer. A method may include identifying, by the API gateway orchestration layer, a first API request, received by an API gateway API, to access a first microservice of a first API gateway that uses a first API gateway model; identifying a second API request, received by the API gateway API, to access a second microservice of a second API gateway that uses a second API gateway model; determining, based on the first API request, a first route to the first API gateway; determining, based on the second API request, a second route to the second API gateway; routing the first API request to the first microservice based on the first route; and routing the second API request to the second microservice based on the second route.

20 Claims, 4 Drawing Sheets

(56) References Cited

U.S. PATENT DOCUMENTS

| | | | |
|---|---|---|---|
| 2023/0077995 A1* | 3/2023 | McGrath | G06F 21/53 |
| | | | 719/328 |
| 2023/0251835 A1* | 8/2023 | Manohar | G06F 8/36 |
| | | | 717/107 |
| 2023/0267017 A1* | 8/2023 | Moreau-Arnott | G06N 20/20 |
| | | | 719/328 |
| 2023/0342226 A1* | 10/2023 | Sangra | G06F 11/3466 |
| 2023/0359513 A1* | 11/2023 | Tummala | G06F 9/5005 |

* cited by examiner

ENHANCED APPLICATION PROGRAMMING INTERFACE GATEWAY ORCHESTRATOR

CROSS-REFERENCE TO RELATED APPLICATIONS

This application is related to and claims priority under 35 U.S.C. § 119(e) from U.S. Patent Application No. 63/383, 896, filed Nov. 15, 2022, titled "ENHANCED APPLICATION PROGRAMMING INTERFACE GATEWAY ORCHESTRATOR," the entire content of which is incorporated herein by reference for all purposes.

TECHNICAL FIELD

Embodiments of the present invention generally relate to systems and methods for application programming interface (API) gateways/firewalls and, more particularly to a multi-vendor API gateway/firewall system.

BACKGROUND

Application programming interface (API) gateways may separate a service provider and external and possibly internal clients, facilitating secure access to the service provider and routing API requests, for example. A service provider may have multiple vendor API gateways lacking a common functional and solution architecture.

SUMMARY

A method for using an application programming interface (API) gateway orchestration layer may include identifying, by at least one processor of the API gateway orchestration layer, a first API request, received by an API gateway API, to access a first microservice of a first API gateway that uses a first API gateway model; identifying, by the at least one processor, a second API request, received by the API gateway API, to access a second microservice of a second API gateway that uses a second API gateway model; determining, by the at least one processor, based on the first API request, a first route to the first API gateway; determining, by the at least one processor, based on the second API request, a second route to the second API gateway; routing, by the at least one processor, the first API request to the first microservice based on the first route; and routing, by the at least one processor, the second API request to the second microservice based on the second route.

An application programming interface (API) gateway orchestration system, the API gateway orchestration system comprising memory coupled to at least one processor, the at least one processor configured to: identify a first API request, received by an API gateway API, to access a first microservice of a first API gateway that uses a first API gateway model; identify a second API request, received by the API gateway API, to access a second microservice of a second API gateway that uses a second API gateway model; determine, based on the first API request, a first route to the first API gateway; determine, based on the second API request, a second route to the second API gateway; route the first API request to the first microservice based on the first route; and route the second API request to the second microservice based on the second route.

A non-transitory storage medium comprising instructions to cause processing circuitry of a device for using an application programming interface (API) gateway orchestration layer, upon execution of the instructions by the processing circuitry, to: identify a first API request, received by an API gateway API, to access a first microservice of a first API gateway that uses a first API gateway model; identify a second API request, received by the API gateway API, to access a second microservice of a second API gateway that uses a second API gateway model; determine, based on the first API request, a first route to the first API gateway; determine, based on the second API request, a second route to the second API gateway; route the first API request to the first microservice based on the first route; and route the second API request to the second microservice based on the second route.

DETAILED DESCRIPTION

Aspects of the present disclosure involve systems, methods, and the like, for enhanced application programming interface (API) gateway/firewall orchestration.

An API gateway is a system that separates external clients and service provider, hyperscaler, or alike applications. The API gateway is responsible for secure access, proxying and routing client API requests to the back-end system, for example. A service provider may have multiple vendor API Gateways.

For a multiple API Gateway implementation, it is more imperative to have a common functional and solution architecture. Not having a common functional architecture may result in the need for multiple support groups, one for each API Gateway implementation.

Currently, to route and configure API requests for different API gateways, a system may have to rely on an API portal of the vendor of an API gateway to determine and configure the route.

In one or more embodiments, the present disclosure describes a method for providing a single, common access for applications to interface with multiple API gateways without having to communicate with each API gateway's communications mechanisms. The enhanced solution herein—the API gateway orchestrator—provides a common management solution for the full life-cycle management of an API gateway. This includes, but is not limited to configuration, security, performance, and fault management. The API gateway orchestrator may be a management layer of a communications system.

In one or more embodiments, the API gateway orchestrator may set a route from the API gateway orchestrator to API gateway of the vendor of a requested resource (e.g., microservice) and push the route and configuration to the API gateway. The API gateway orchestrator may implement a schema and management API defining configuration values for given API gateways and routes to various API gateways. When the API gateway orchestrator detects an API request for a resource of a given API gateway, the API gateway orchestrator may use the management API and schema(s) to generate a route and configuration, and may route the API request to the API gateway associated with the requested resource, using the route and the configuration.

In one or more embodiments, the API gateway orchestrator may support receiving client API calls and routing them to internal systems (e.g., microservices), communicating with an identity access and manager (IAM) to verify API keys, JSON (JavaScript Object Notation) web tokens (JWT tokens), certificates, and other credentials, providing policy configuration and enforcement for API requests/responses, providing loggings, telemetry, and traces for monitoring, reporting, and troubleshooting, and providing analytics capability.

In one or more embodiments, the API gateway performance management functionality may be based on API monitoring best practices. This present disclosure provides a normativity such that APIs provided will be properly lifecycle-managed. Responsibilities include proper operation, performance, and security aspects. The performance management functionality from the API gateway and supporting systems may include providing API monitoring. The API monitoring enables the Orchestrator to coordinate such functions as communication to each Gateway when to throttle or prioritize specific API calls. Specifically, each API may be monitored for availability, performance, feature changes, security, and integrations—with partner APIs. The present disclosure provides the idea of having the API gateway orchestrator that provides a normalization and mapping to and from each individual API gateway vendor.

In one or more embodiments, the API gateway may support an integration with or implementation of IAM as a component of the API gateway security. The API gateway may support API types of REST, GraphQL, WebSockets. It may be necessary to support a Broker-based (i.e., Kafka) communication directly between server and client.

In one or more embodiments, the API gateway pattern provides a front-end single-entry point access to backend systems. The API gateway orchestrator may be positioned between the client applications and backend systems, acting as a reverse proxy, and routing request from clients to services. The API gateway orchestrator may also provide authentication, secure sockets layer (SSL) termination and cache. Some API gateway vendors will provide APIs for configuration and collection. The API gateway orchestrator should support the following functions, which include performance management: Security (e.g., authentication and potentially authorization), managing access quotas and throttling, caching (e.g., proxy statements and cache), API composition and processing, routing (e.g., possibly processing) to an "internal" API, API performance management and monitoring, and versioning.

In one or more embodiments, an individual API gateway must provide adequate security firewall mechanisms. It is therefore likely that the API gateway solution may incorporate a security firewall as an integrated system within the overall solution.

In one or more embodiments, when multiple API gateway solutions are implemented, an orchestration functional architecture may be implemented. The responsibilities of the API gateway orchestrator are to normalize and abstract clients from vendor specific APIs and/or data. Clients of an API gateway orchestrator should be abstracted from having to know with which vendor and corresponding APIs to interface. The API gateway orchestrator is responsible for providing an open set of APIs to which all clients may interface. The API gateway orchestrator may provide the necessary mapping to and from each vendor API implementation.

In one or more embodiments, a function of the API gateway orchestrator is to communicate with each vendor or individual API gateway using the disclosed communication mechanisms. These mechanisms can include, but are not limited to APIs, logging (i.e., Syslog), and database access. The API gateway orchestrator may be responsible for providing the necessary mapping from each API gateway information model to an open and standard information model or schema. The API gateway orchestrator also may be responsible for providing open and standard API gateway set of APIs to clients to support all the functional components of lifecycle management of any API gateway.

In one or more embodiments, when the API gateway orchestrator is communicating with individual API gateways, it may be necessary to augment or provide additional metadata before updating northbound API clients and/or databases, Kafka streams, etc. The combination of mapping between vendor specific models and addition of meta-data is considered the normalization process.

In one or more embodiments, the implementation of an API gateway orchestration layer must be implemented without interfering with a short-to medium-term solution. The short-term solution will likely need to collect statistics/telemetry/logs and events directly from the API gateway. More specifically, it is assumed that the API gateway vendor APIs are not leveraged.

In one or more embodiments, the orchestration layer, to provide a layered and abstracted view to clients, will likely need to have open API design and development for configuration, policy management, statistics collection, fault management and Threshold Crossing Alert (TCA) management. The orchestration layer will also need to map from each vendor API gateway models for configuration, policy management, statistics collection, fault management and TCA management to a common set of models.

The present disclosure provides an orchestration layer and solution whereby any number of vendor solutions can be implemented by a provider. The support for a multi-vendor API gateway system is presented herein. The implementation of an API gateway orchestrator provides an abstraction layer for clients that require an API gateway functionality in a common manner and does not require the client configurations to be vendor aware.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
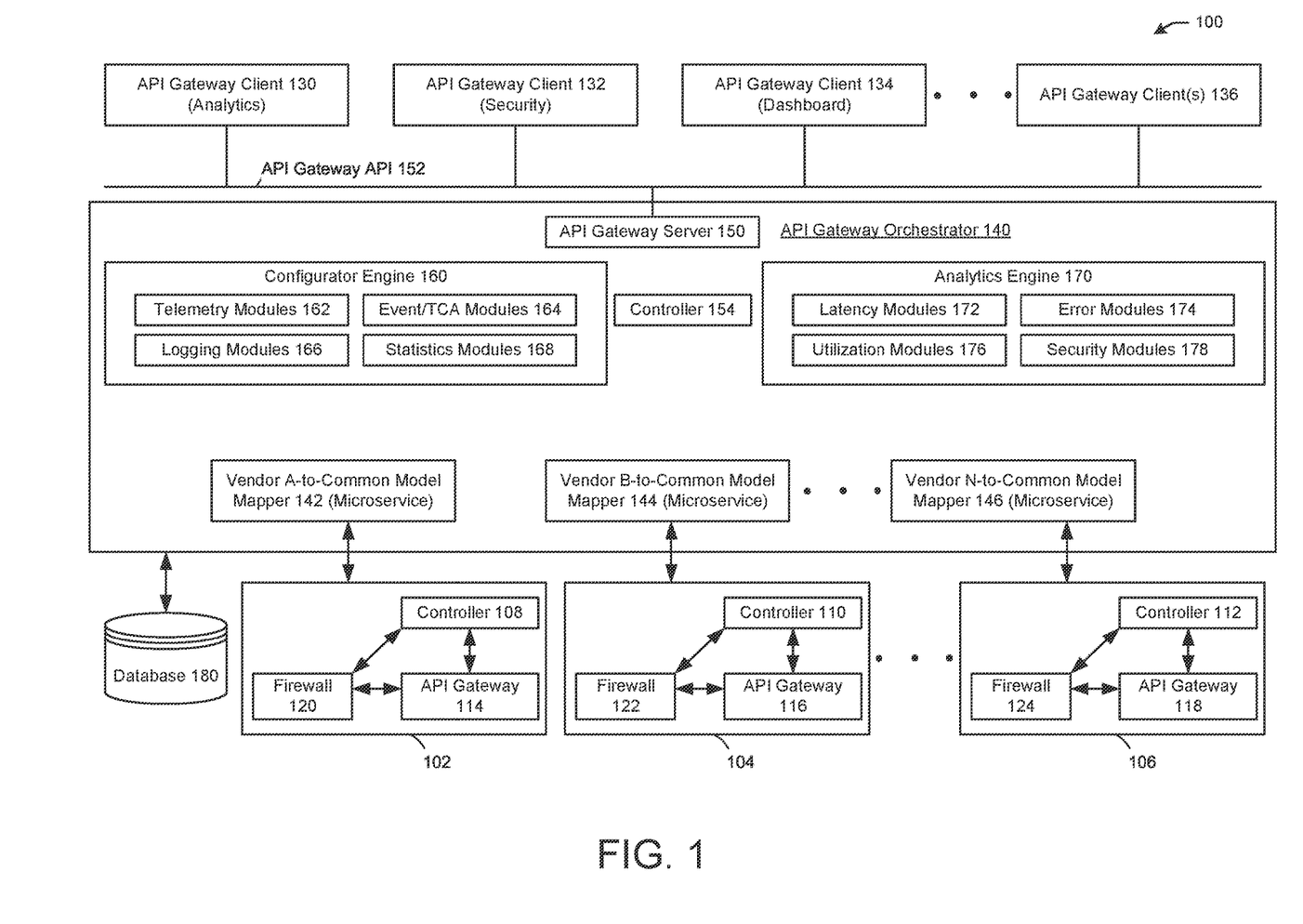
FIG. 1 illustrates an example system using an application programming interface (API) gateway orchestrator in accordance with one embodiment.

FIG. 1 illustrates an example system 100 using an application programming interface (API) gateway orchestrator in accordance with one embodiment.

Referring to FIG. 1, the system 100 may include multiple vendor APIs (e.g., API 102, API 104, . . . , API 106, etc.), each with a controller (e.g., controller 108, controller 110, . . . , controller 112, etc.), API gateway (e.g., API gateway 114, API gateway 116, . . . , API gateway 118, etc.), and firewall (e.g., firewall 120, firewall 122, . . . , firewall 124, etc.). To allow clients (e.g., an API gateway client 130 for analytics, an API gateway client 132 for security, an API gateway client 134 for a dashboard, and/or other API gateway clients 136) to avoid having to identify which vendor API to use for a given request, and with which vendor APIs to interface, an API gateway orchestrator 140 may provide an open set of APIs to which any clients may interface. The API gateway orchestrator 140 may provide mapping (e.g., as micro-services) to and from the vendor APIs so that clients do not need to do so.

Still referring to FIG. 1, the API gateway orchestrator 140 may include an API gateway server 150 for receiving API requests from the clients (e.g., via an API gateway API 152 usable by any of the clients). A controller 154 of the API gateway orchestrator 140 may determine the vendor-to-common model mapper (e.g., a microservice(s): Vendor A-to-common model mapper 142, Vendor B-to-common model mapper 144, . . . , Vendor N-to-common model mapper 146, etc.)) to use in response to an API request from any of the clients. For example, an API request may map to a microservice of vendor A, and the API gateway orchestrator 140 may identify and select the vender A-to-common model mapper 142 to implement for calling the vendor A microservice using the vendor A API (e.g., the API 102).

Still referring to FIG. 1, the API gateway orchestrator 140 may include a configurator engine 160 (e.g., modules), including telemetry modules 162 for measuring and providing system telemetry, event/TCA modules 164 for fault/TCA management, logging modules 166 for providing loggings (e.g., Syslog), and statistics modules 168 for determining and providing system statistics. The API gateway orchestrator 140 also may include an analytics engine 170, including latency modules 172 for analyzing system latency, error modules 174 for detecting and analyzing system errors, utilization modules 176 for detecting and analyzing system utilization, and security modules 178 for analyzing system security. Data for the configurator engine 160 and the analytics engine 170 may be stored in one or more databases (e.g. database 180).

In one or more embodiments, the API gateway orchestrator 140 provides a single, common access for applications to interface with multiple API gateways of multiple vendors without having to communicate with each vendor API gateway's communications mechanisms.

In one or more embodiments, the API gateway orchestrator 140 may support receiving client API calls (e.g., via the API gateway API 152) and routing them to internal systems (e.g., the vendor microservices), communicating with an IAM to verify API keys, JWT tokens, certificates, and other credentials, providing policy configuration and enforcement for API requests/responses, providing loggings, telemetry, and traces for monitoring, reporting, and troubleshooting, and providing analytics capability.

In one or more embodiments, the API gateway orchestrator 140 may provide performance management functionality based on API monitoring. The API gateway orchestrator 140 may perform API monitoring. Specifically, each vendor API may be monitored for availability, performance, feature changes, security, and integrations—with partner APIs. The API gateway orchestrator 140 provides a normalization and mapping to and from each individual API gateway vendor.

In one or more embodiments, the API gateway orchestrator 140 may support an integration with or implementation of IAM as a component of the API gateway security. The API gateway orchestrator 140 may support API types of REST, GraphQL, WebSockets. It may be necessary to support a Broker-based (i.e., Kafka) communication directly between server and client.

In one or more embodiments, the API gateway orchestrator 140 provides a front-end single-entry point access to backend systems. The API gateway orchestrator 140 may be positioned between the client applications and backend systems, acting as a reverse proxy, and routing request from clients to services (e.g., the API gateway clients and services using the APIs 102, 104, 106, etc.). The API gateway orchestrator 140 may also provide authentication, SSL termination and cache. Some API gateway vendors will provide APIs for configuration and collection. The API gateway orchestrator 140 should support the following functions, which include performance management: Security (e.g., authentication and potentially authorization), managing access quotas and throttling, caching (e.g., proxy statements and cache), API composition and processing, routing (e.g., possibly processing) to an "internal" API, API performance management and monitoring, and versioning.

In one or more embodiments, the individual API gateways (e.g., the API gateways 114, 116, 118, etc.) must provide adequate security firewall mechanisms. It is therefore likely that the API gateway orchestrator 140 may incorporate a security firewall as a separate system within the overall solution.

In one or more embodiments, when multiple API gateway solutions are implemented, an orchestration functional architecture may be implemented. The responsibilities of the API gateway orchestrator 140 are to normalize and abstract clients from vendor specific APIs and/or data. Clients of an API gateway orchestrator 140 should be abstracted from having to know with which vendor and corresponding APIs to interface. The API gateway orchestrator 140 may responsible for providing an open set of APIs to which all clients may interface. The API gateway orchestrator 140 may provide the necessary mapping to and from each vendor API implementation.

In one or more embodiments, a function of the API gateway orchestrator 140 is to communicate with each vendor or individual API gateway using the disclosed solutions communication mechanisms. These mechanisms can include, but are not limited to APIs, logging (i.e., Syslog), and database access. The API gateway orchestrator 140 may be responsible for providing the necessary mapping from each API gateway information model to an open and standard information model or schema. The API gateway orchestrator 140 also may be responsible for providing open and standard API gateway set of APIs to clients to support all the functional components of lifecycle management of any API gateway.

In one or more embodiments, when the API gateway orchestrator 140 is communicating with individual API gateways (e.g., the API gateways 114, 116, 118), it may be necessary to augment or provide additional metadata before updating northbound API clients and/or databases, Kafka streams, etc. The combination of mapping between vendor specific models and addition of meta-data is considered the normalization process.

In one or more embodiments, the implementation of an API gateway orchestration layer (the API gateway orchestrator 140) must be implemented without interfering with a short- to medium-term solution. The short-term solution will likely need to collect statistics/telemetry/logs and events directly from the API gateway. More specifically, it is assumed that the API gateway vendor APIs are not leveraged.

In one or more embodiments, the orchestration layer, to provide a layered and abstracted view to clients, will likely need to have open API design and development for configuration, policy management, statistics collection, fault management and threshold crossing alert (TCA) management. The orchestration layer will also need to map from each vendor API gateway models for configuration, policy management, statistics collection, fault management and TCA management to a common set of models.

The API gateway orchestrator 140 allows any number of vendor solutions to be implemented by a provider. The implementation of the API gateway orchestrator 140 provides an abstraction layer for clients that require an API gateway functionality in a common manner and does not require the client configurations to be vendor aware.

Figure 2:
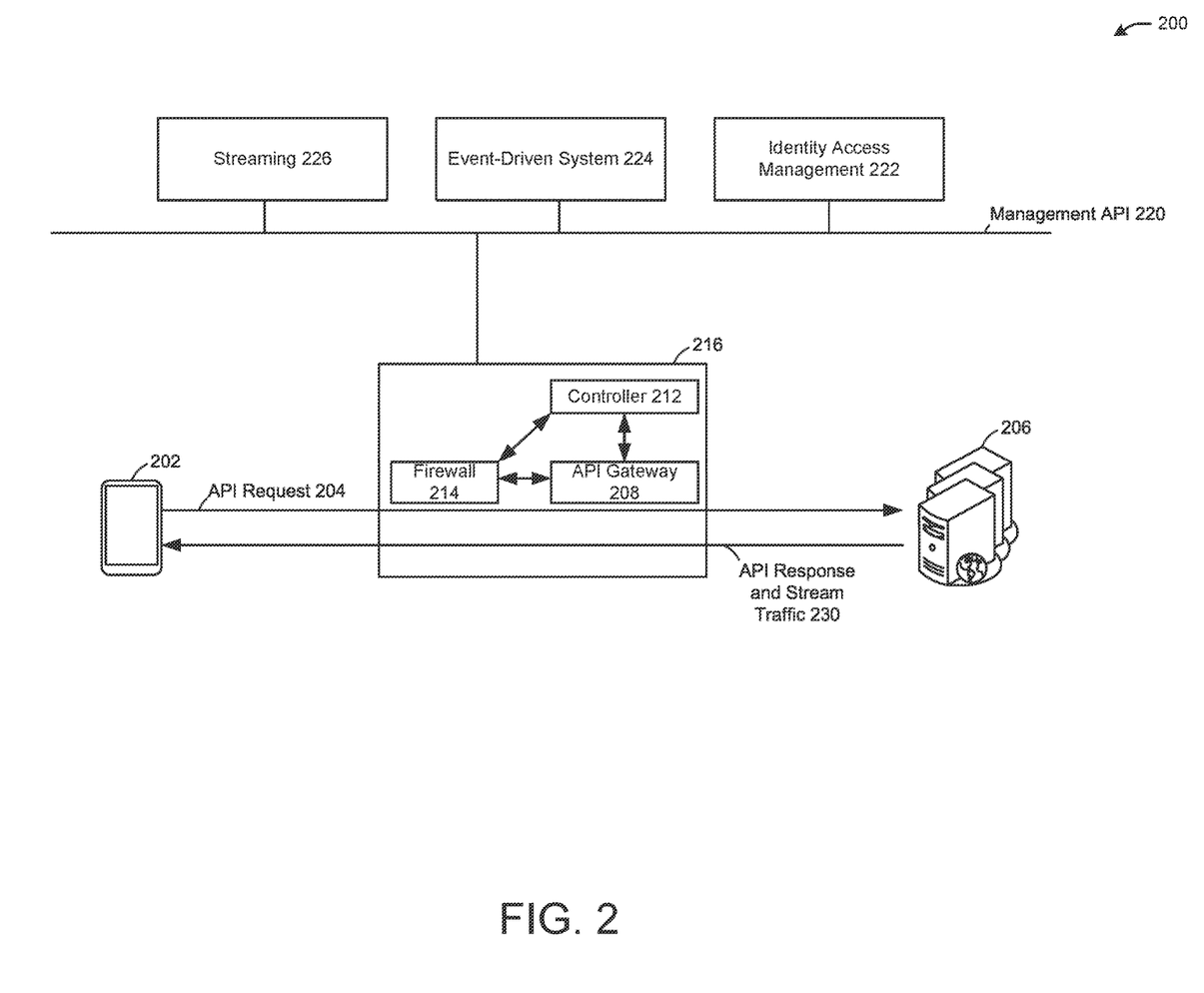
FIG. 2 illustrates an example system using individual API gateways in accordance with one embodiment.

FIG. 2 illustrates an example system 200 using individual API gateways in accordance with one embodiment.

Referring to FIG. 2, the system 200 uses individual API gateways without the API gateway orchestrator 140 of FIG. 1. As shown, clients 202 may send API requests 204 to servers 206 (e.g., hosting vendor microservices). The vendor API gateway 208 may be specific to the vendor, and may include a controller, the API gateway 208, and a firewall 214. The vendor API 216 may use a management API 220 for identity and access management 222 (e.g., IAM, certificates, etc.), an event-driven system 224, and event streaming 226. API responses and stream traffic 230 may be sent back to the clients 202.

However, when multiple individual vendor APIs are used as shown in FIG. 1, a client sending an API request may need to identify the vendor and corresponding API with which to interface (e.g., the vendor API 216). This can be inefficient, which is why the API gateway orchestrator 140 of FIG. 1 offers enhancements when the vendor API 216 of FIG. 2 is one of multiple vendor APIs accessible to clients.

In one or more embodiments, the vendor API gateway devices (e.g., the API gateways 114, 116, 118, 208) may include, without limitation, at least one of an API gateway, a network gateway, an access provider telemetry business gateway ("BG"), a virtual gateway ("vG"), or a network interface device ("NID"), and/or the like. Each of the computing systems might include, but is not limited to, at least one of an API gateway, a network gateway, an access provider telemetry business gateway, a residential gateway ("RG"), a business gateway ("BG"), a virtual gateway ("vG"), a network interface device ("NID"), a third party computing system, a customer computing system, an internal network-to-network interface ("INNI") system, an external network-to-network interface ("ENNI") system, a network server, a distributed computing system, or a cloud computing system, and/or the like.

Figure 3:
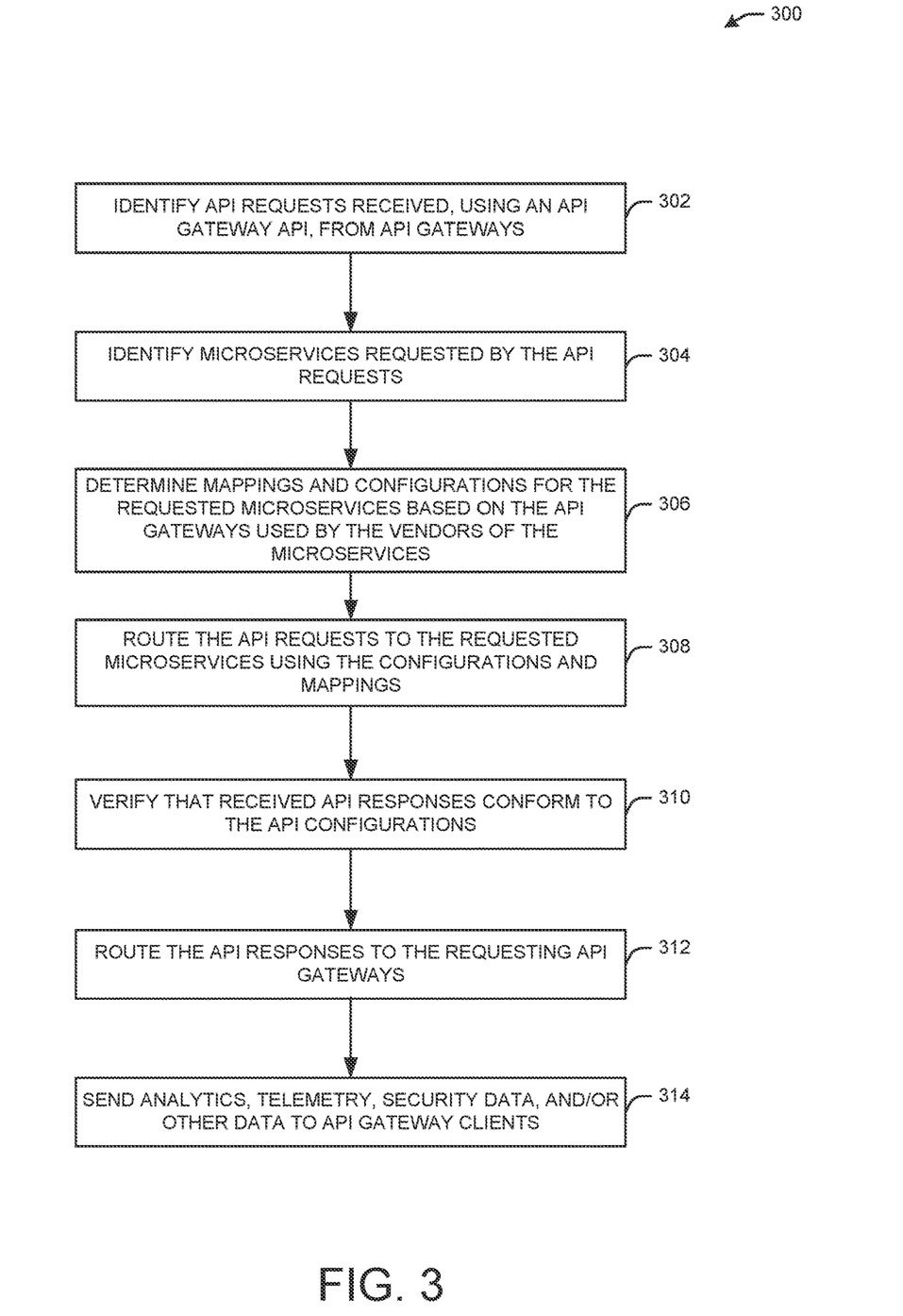
FIG. 3 is a flow for a process for using an API gateway orchestrator in accordance with one embodiment.

FIG. 3 is a flow for a process 300 for using an API gateway orchestrator in accordance with one embodiment.

At block 302, a device (or system, e.g., the API gateway orchestrator 140 of FIG. 1, the API gateway orchestration devices 409 of FIG. 4) may identify API requests received from API gateway clients using a common API gateway API (e.g., as shown in FIG. 1). The API requests may use a same or different configurations/protocols, and may request microservices provided by one or multiple venders. At block 304, the device may identify the microservices requested in the respective API requests.

At block 306, the device may determine mappings and configurations to the vendor API gateways corresponding to the requested microservices. The device may need to map from each vendor API gateway models for configuration, policy management, statistics collection, fault management and TCA management to a common set of models. The device may build a template defining configuration values for given API gateways and routes to various API gateways. When the device detects an API request for a resource of a given API gateway, the API gateway orchestrator may use the template to generate a route and configuration, and may route the API request to the API gateway associated with the requested resource, using the route and the configuration. The configuration may include the API model/protocol, timeouts, and the like.

At block 308, the device may route the API requests to the vendor API gateways for the corresponding microservices using the routes and configurations for the respective vendor API gateways.

At block 310, the device may receive API responses to the API requests from the vendor API gateways, and may verify that the API responses use (e.g., conform to) the configurations for the exchange between the requesting API gateway client and the vendor API gateway. At block 312, the device may route the API responses to the corresponding API gateway clients that sent the API requests for given microservices. The API responses may be routed using the same API gateway API with which the API gateway clients sent the API requests.

At block 314, the device may send analytics, telemetry data, security data, and/or other data to the API clients. The device may communicate with an IAM to verify API keys, JWT tokens, certificates, and other credentials, providing policy configuration and enforcement for API requests/responses, providing loggings, telemetry, and traces for monitoring, reporting, and troubleshooting, and providing analytics capability.

It is understood that the above descriptions are for purposes of illustration and are not meant to be limiting.

Figure 4:
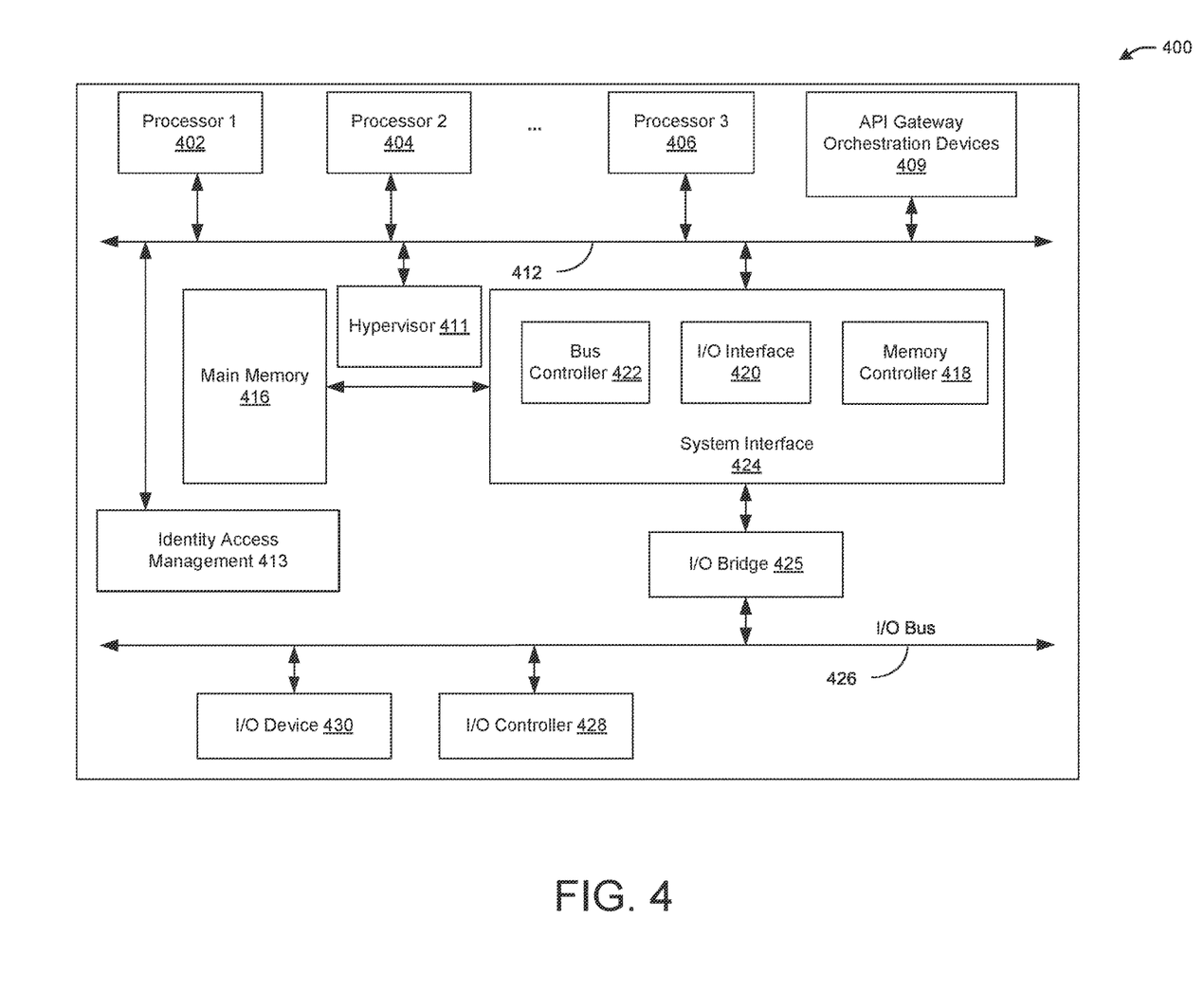
FIG. 4 is a diagram illustrating an example of a computing system that may be used in implementing embodiments of the present disclosure.

FIG. 4 is a block diagram illustrating an example of a computing device or computer system 400 which may be used in implementing the embodiments of the components of the network disclosed above. For example, the computing system 400 of FIG. 4 may represent at least a portion of the system 100 shown in FIG. 1, as discussed above. The computer system (system) includes one or more processors 402-406, one or more API gateway orchestration devices 409 (e.g., representing the API gateway orchestrator of FIG. 1), a hypervisor 411 (e.g., to instantiate and run virtual machines), and an IAM 413. Processors 402-406 may include one or more internal levels of cache (not shown) and a bus controller 422 or bus interface unit to direct interaction with the processor bus 412. Processor bus 412, also known as the host bus or the front side bus, may be used to couple the processors 402-806 with the system interface 424. System interface 424 may be connected to the processor bus 412 to interface other components of the system 400 with the processor bus 412. For example, system interface 424 may include a memory controller 418 for interfacing a main memory 416 with the processor bus 412. The main memory 416 typically includes one or more memory cards and a control circuit (not shown). System interface 424 may also include an input/output (I/O) interface 420 to interface one or more I/O bridges 425 or I/O devices with the processor bus 412. One or more I/O controllers and/or I/O devices may relate to the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system outlined in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 406 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 416, which may be referred to as machine-readable media. It will be appreciated that machine-readable media may include any tangible non-transitory medium that can store or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for using an application programming interface (API) gateway orchestration layer, the method comprising:
    identifying, by at least one processor of the API gateway orchestration layer, a first API request, received by an API gateway API, to access a first microservice of a first API gateway that uses a first API gateway model;
    identifying, by the at least one processor, a second API request, received by the API gateway API, to access a second microservice of a second API gateway that uses a second API gateway model;
    determining, by the at least one processor, based on the first API request, a first route to the first API gateway;
    determining, by the at least one processor, based on the second API request, a second route to the second API gateway;
    routing, by the at least one processor, the first API request to the first microservice based on the first route; and
    routing, by the at least one processor, the second API request to the second microservice based on the second route.

2. The method of claim 1, wherein the API gateway orchestration layer is a management layer of an API gateway orchestration system.

3. The method of claim 1, wherein the first API request is received from a first API gateway client, and wherein the second API request is received from a second API gateway client different than the first API gateway client.

4. The method of claim 1, further comprising:
    identifying, based on the first API request, a first configuration associated with the first API gateway; and
    identifying, based on the second API request, a second configuration associated with the second API gateway, the second configuration different than the first configuration,
    wherein routing the first API request is further based on the first configuration, and
    wherein routing the second API request is further based on the second configuration.

5. The method of claim 4, further comprising:
    identifying a first API response received from the first API gateway based on the first API request;
    identifying a second API response received from the second API gateway based on the second API request;
    determining that the first API response uses the first configuration;
    determining that the second API responses uses the second configuration;
    routing, based on the determination that the first API response uses the first configuration, the first API response to a first API gateway client from which the first API request was received, and
    routing, based on the determination that the second API response uses the second configuration, the second API response to a second API gateway client from which the second API request was received.

6. The method of claim 1, further comprising:
sending, to an API gateway client, syslog message logging data, telemetry data, and instruction trace data.

7. The method of claim 1, further comprising:
sending, to an API gateway client, analytics data comprising a number of API calls detected, error rates associated with API calls, API gateway security data, and latency associated with API calls.

8. The method of claim 1, further comprising:
authenticating a first API gateway client from which the first API request was received, wherein routing the first API request is further based on authenticating the first API gateway client; and
authenticating a second API gateway client from which the second API request was received, wherein routing the second API request is further based on authenticating the second API gateway request.

9. An application programming interface (API) gateway orchestration system, the API gateway orchestration system comprising memory coupled to at least one processor, the at least one processor configured to:
identify a first API request, received by an API gateway API, to access a first microservice of a first API gateway that uses a first API gateway model;
identify a second API request, received by the API gateway API, to access a second microservice of a second API gateway that uses a second API gateway model;
determine, based on the first API request, a first route to the first API gateway;
determine, based on the second API request, a second route to the second API gateway;
route the first API request to the first microservice based on the first route; and
route the second API request to the second microservice based on the second route.

10. The API gateway orchestration system of claim 9, wherein the first API request is received from a first API gateway client, and wherein the second API request is received from a second API gateway client different than the first API gateway client.

11. The API gateway orchestration system of claim 9, wherein the at least one processor is further configured to:
identify, based on the first API request, a first configuration associated with the first API gateway; and
identify, based on the second API request, a second configuration associated with the second API gateway, the second configuration different than the first configuration,
wherein to route the first API request is further based on the first configuration, and
wherein to route the second API request is further based on the second configuration.

12. The API gateway orchestration system of claim 11, wherein the at least one processor is further configured to:
identify a first API response received from the first API gateway based on the first API request;
identify a second API response received from the second API gateway based on the second API request;
determine that the first API response uses the first configuration;
determine that the second API responses uses the second configuration;
route, based on the determination that the first API response uses the first configuration, the first API response to a first API gateway client from which the first API request was received, and
route, based on the determination that the second API response uses the second configuration, the second API response to a second API gateway client from which the second API request was received.

13. The API gateway orchestration system of claim 9, wherein the at least one processor is further configured to:
sending, to an API gateway client, syslog message logging data, telemetry data, and instruction trace data.

14. The API gateway orchestration system of claim 9, wherein the at least one processor is further configured to:
send, to an API gateway client, analytics data comprising a number of API calls detected, error rates associated with API calls, API gateway security data, and latency associated with API calls.

15. The API gateway orchestration system of claim 9, wherein the at least one processor is further configured to:
authenticate a first API gateway client from which the first API request was received, wherein to route the first API request is further based on authenticating the first API gateway client; and
authenticate a second API gateway client from which the second API request was received, wherein to route the second API request is further based on authenticating the second API gateway request.

16. A non-transitory storage medium comprising instructions to cause processing circuitry of a device for using an application programming interface (API) gateway orchestration layer, upon execution of the instructions by the processing circuitry, to:
identify a first API request, received by an API gateway API, to access a first microservice of a first API gateway that uses a first API gateway model;
identify a second API request, received by the API gateway API, to access a second microservice of a second API gateway that uses a second API gateway model;
determine, based on the first API request, a first route to the first API gateway;
determine, based on the second API request, a second route to the second API gateway;
route the first API request to the first microservice based on the first route; and route the second API request to the second microservice based on the second route.

17. The non-transitory storage medium of claim 16, wherein the API gateway orchestration layer is a management layer of an API gateway orchestration system.

18. The non-transitory storage medium of claim 16, wherein execution of the instructions further causes the processing circuitry to:
identify, based on the first API request, a first configuration associated with the first API gateway; and
identify, based on the second API request, a second configuration associated with the second API gateway, the second configuration different than the first configuration,
wherein to route the first API request is further based on the first configuration, and
wherein to route the second API request is further based on the second configuration.

19. The non-transitory storage medium of claim 18, wherein execution of the instructions further causes the processing circuitry to:
identify a first API response received from the first API gateway based on the first API request;
identify a second API response received from the second API gateway based on the second API request;

determine that the first API response uses the first configuration;
determine that the second API responses uses the second configuration;
route, based on the determination that the first API response uses the first configuration, the first API response to a first API gateway client from which the first API request was received, and
route, based on the determination that the second API response uses the second configuration, the second API response to a second API gateway client from which the second API request was received.

20. The non-transitory storage medium of claim 16, wherein execution of the instructions further causes the processing circuitry to:
sending, to an API gateway client, syslog message logging data, telemetry data, and instruction trace data.

\* \* \* \* \*